United States Patent
Shibatani (10) Patent No.: US 8,575,870 B2
(45) Date of Patent: *Nov. 5, 2013

(54) VIBRATORY DRIVING DEVICE

(75) Inventor: Kazuhiro Shibatani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 612 days.

This patent is subject to a terminal disclaimer.

(21) Appl. No.: 12/782,171

(22) Filed: May 18, 2010

(65) Prior Publication Data

US 2010/0295488 A1 Nov. 25, 2010

(30) Foreign Application Priority Data

May 20, 2009 (JP) ................................. 2009-122186

(51) Int. Cl.
*H02K 33/00* (2006.01)

(52) U.S. Cl.
USPC .......................................... 318/119; 318/135

(58) Field of Classification Search
USPC .................................................. 318/119, 135
See application file for complete search history.

(56) References Cited

U.S. PATENT DOCUMENTS

| 7,633,211 B2* | 12/2009 | Sasaki | 310/328 |
| 7,663,291 B2* | 2/2010 | Hoshino | 310/317 |
| 7,692,078 B2* | 4/2010 | Hayashi et al. | 84/22 |
| 7,965,457 B2* | 6/2011 | Shibatani | 359/824 |
| 8,269,397 B2* | 9/2012 | Nakamura et al. | 310/317 |
| 8,274,197 B2* | 9/2012 | Shibatani et al. | 310/317 |
| 2004/0051408 A1* | 3/2004 | Karrelmeyer et al. | 310/68 B |
| 2004/0239279 A1* | 12/2004 | Komiya et al. | 318/606 |
| 2005/0232094 A1* | 10/2005 | Hoshino | 369/44.11 |
| 2005/0248234 A1* | 11/2005 | Hoshino | 310/328 |
| 2007/0035210 A1* | 2/2007 | Sasaki | 310/329 |
| 2007/0036533 A1* | 2/2007 | Sasaki | 396/75 |
| 2010/0296184 A1* | 11/2010 | Shibatani | 359/824 |

FOREIGN PATENT DOCUMENTS

| JP | 2000205809 A | * | 7/2000 |
| JP | 2003185406 A | * | 7/2003 |
| JP | 2005-284169 A | | 10/2005 |
| JP | 2006-113874 A | | 4/2006 |

\* cited by examiner

*Primary Examiner* — Kawing Chan
(74) *Attorney, Agent, or Firm* — Brinks Gilson & Lione (57) ABSTRACT

A vibratory driving device includes a shaft-like driving member, an electromechanical transducer which can incline the driving member and which also can displace the driving member in the axial direction of the driving member, a movable member which slidably engages on the driving member, a driving circuit which can apply to the electromechanical transducer a frictional driving voltage displacing the driving member back and forth with a speed varying asymmetrically in the axial direction to slidingly displace the movable member with respect to the driving member and a periodic inclination driving voltage oscillating the driving member, a resonance frequency meter which measures a resonance frequency of the inclining oscillation of the driving member, and a position estimator which estimates a position of the movable member based on the resonance frequency.

7 Claims, 7 Drawing Sheets

VIBRATORY DRIVING DEVICE

This application is based on application No. 2009-122186 filed in Japan, the contents of which are hereby incorporated by reference.

FIELD OF THE INVENTION

The present invention relates to a vibratory driving device.

DESCRIPTION OF THE RELATED ART

It is publicly known a vibratory driving device which oscillates a driving member in its axial direction in a asymmetrical manner by a electromechanical transducer to displace slidingly a movable member which slidably engages on the driving member with respect to the driving member. In the vibratory driving device, a displacing amount of the movable member per cycle of a driving voltage applied to the electromechanical transducer is not precisely constant. Therefore, an actual position of the movable member is possibly offset from a position estimated based on the driving voltage (in a case of a pulse driving, a position moved a distance proportional to the number of pulses).

For this reason, in the case of positioning with a conventional vibratory driving device, as described in the JP 2006-113874 A and the JP 2005-284169 A, it is required to provide a sensor and a circuit dedicated to detecting a position of the movable member, hence a cost up and a growing in size are caused. Moreover, the sensor as described in the JP 2006-113874 A and the JP 2005-284169 A has a problem that the linear range of the position detection is narrow and prosecution of complex operation is required to calculate the position.

SUMMARY OF THE INVENTION

In view of the above problem, it is an object of the present invention to provide a driving device of detecting a position of a movable member with simple construction.

In order to achieve the objects of the present invention, there is provided a vibratory driving device comprising: a shaft-like driving member, a electromechanical transducer which can incline the driving member and which also can displace the driving member in the axial direction of the driving member, a movable member which slidably engages on the driving member, a driving circuit which can apply to the electromechanical transducer a periodical frictional driving voltage displacing the driving member back and forth with a speed varying asymmetrically in the axial direction to displace slidingly the movable member with respect to the driving member and a periodical inclination driving voltage inclinatory oscillating the driving member, a resonance frequency meter which measures a resonance frequency of the inclining oscillation of the driving member, and a position estimator which estimates a position of the movable member based on the resonance frequency.

In accordance with this constitution, since the swinging radius of the of the movable member which is swung by the inclining oscillation of the driving member is determined according to the position of the movable member, a moment of inertia of the driving member together with the movable member varies according to the position of the movable member. Because the resonance frequency of the inclining oscillation of the driving member varies due to the variance of the moment of inertia of the driving member together with the movable member, by measuring the resonance frequency, the position of the movable member can be backward calculated.

Further, since the change rate of the swinging radius of the movable member is large, variance of the resonance frequency is sufficiently large. Hence the position of the movable member can be accurately estimated. Additionally, the range of the resonance frequency is substantially low, and therefore the movable member is avoided from displacing slidingly by the inclination driving voltage.

In the vibratory driving device according to the present invention, the resonance frequency meter may detect an electrical resonance of the electromechanical transducer.

In accordance with this constitution, when the driving member is in a resonance condition, the electromechanical transducer which acts integrally with the driving member is also resonating mechanically and electrically. Therefore, by detecting a resonance of the electromechanical transducer, a resonance of the driving member can be easily determined.

In the vibratory driving device according to the present invention, the resonance frequency meter may assume a frequency where a phase difference between a voltage and a current of the electromechanical transducer is eliminated, as the resonance frequency.

When the driving member resonates, a power factor of the electromechanical transducer is 100%, therefore the phase difference between a voltage and a current is eliminated. Hence a resonance can be detected based on phase difference between a voltage and a current of the electromechanical transducer.

In the vibratory driving device according to the present invention, the electromechanical transducer may have a plurality of, typically two, elongatable portions which can elongate and contract in the axial direction of the driving member respectively and which are provided in parallel with each other, and the inclination driving voltage is to apply periodical voltages having a phase opposite each other to the elongatable portions located in a symmetrical position.

In accordance with this constitution, by applying frictional driving voltages in same phase to all of the elongatable portions the driving member is displaced in the axial direction without inclining, and also, by applying inclination driving voltage in opposite phase to the elongatable portions located in a symmetrical position, the driving member is inclinatory oscillated without displacement in the axial direction to allow measurement of the resonance frequency.

In the vibratory driving device according to the present invention, the electromechanical transducer may elongate and contract in the axial direction of the driving member and is partially restrained so as to restrict the elongation and contraction of the electromechanical transducer in an imbalanced manner.

In accordance with this constitution, only one system of driving circuit is required.

Furthermore, an optical apparatus according to the present invention comprises the aforesaid vibratory driving device and an optical member held by the movable member of the vibratory driving device, wherein the optical member is positioned based on a position of the movable member estimated by the position estimator.

In the vibratory driving device according to the present invention, since the moment of inertia of the driving member according to the position of the movable member, by measuring the resonance frequency varying with the moment of inertia while the driving member is inclinatory oscillated.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENT

Figure 1:
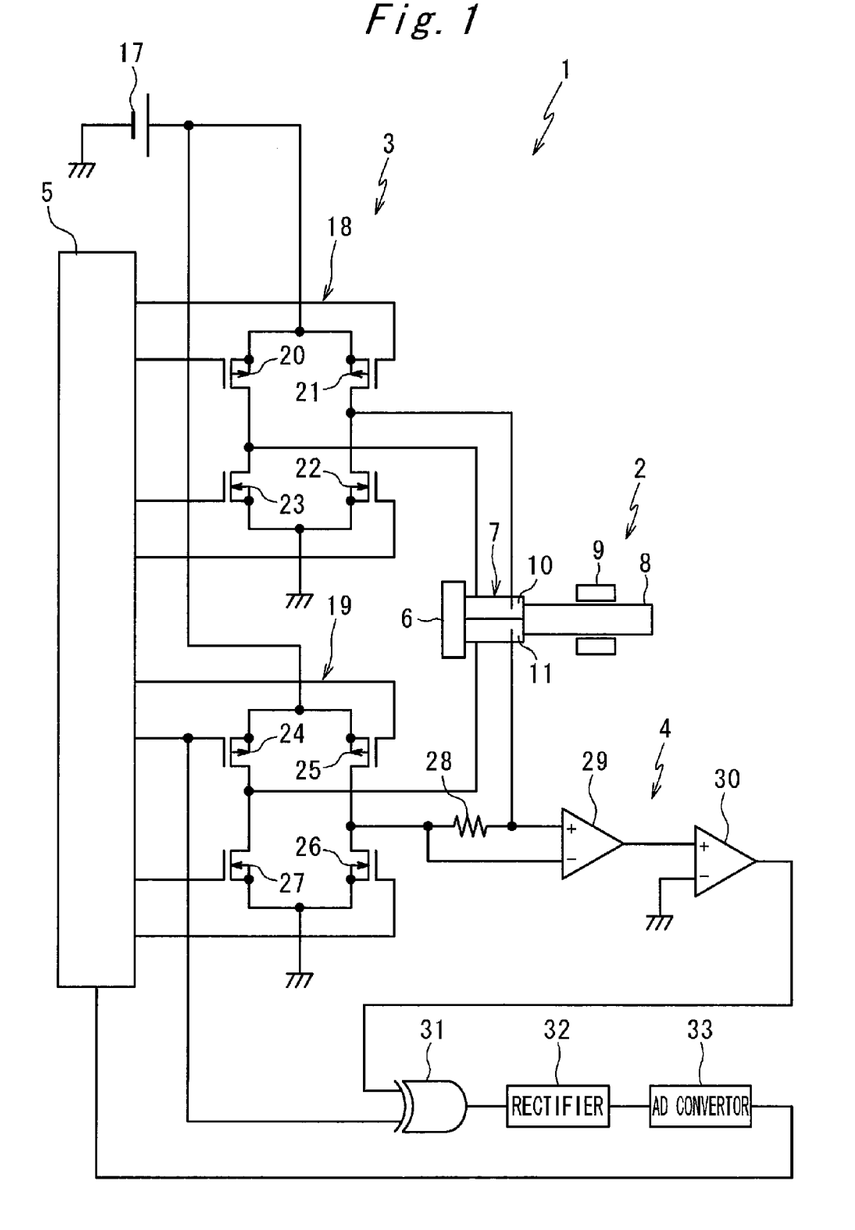
FIG. 1 is a circuit diagram of a vibratory driving device as first embodiment according to the present invention.

Hereinafter, embodiments of the present invention will be described referring to the drawings. FIG. 1 shows a vibratory driving device 1 as first embodiment according to the present invention. The vibratory driving device 1 has an actuator 2 as a mechanically constructional element, a driving circuit 3 to drive the actuator 2, a phase difference detection circuit 4 for detecting electrical resonance condition of the actuator 2, and a controller 5 consisting of a microcomputer.

Figure 2:
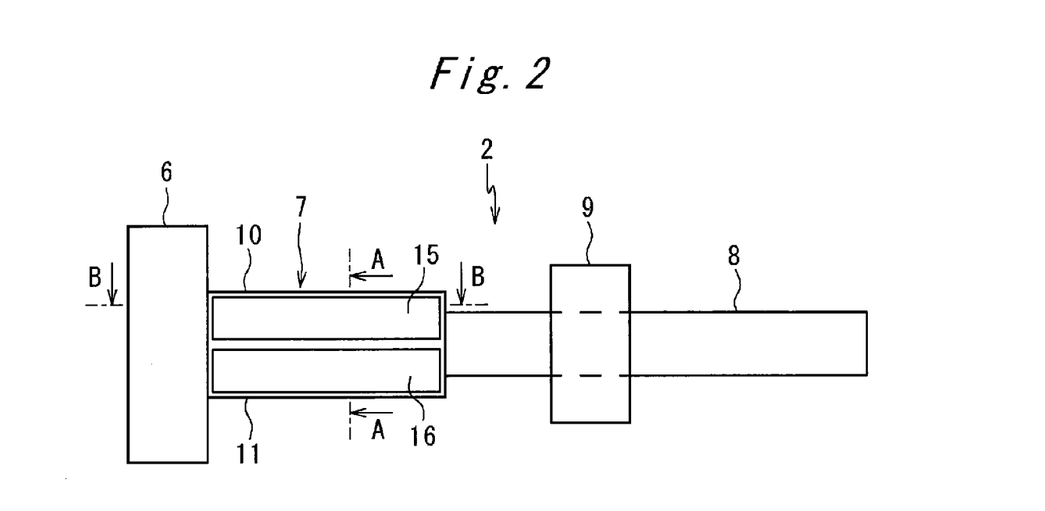
FIG. 2 is a detailed view of an actuator of the driving device in FIG. 1.
Figure 3:
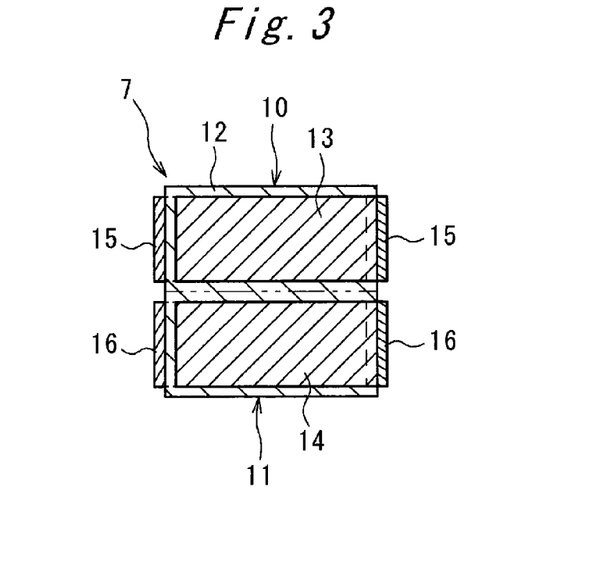
FIG. 3 is a sectional view at A-A in FIG. 2.
Figure 4:
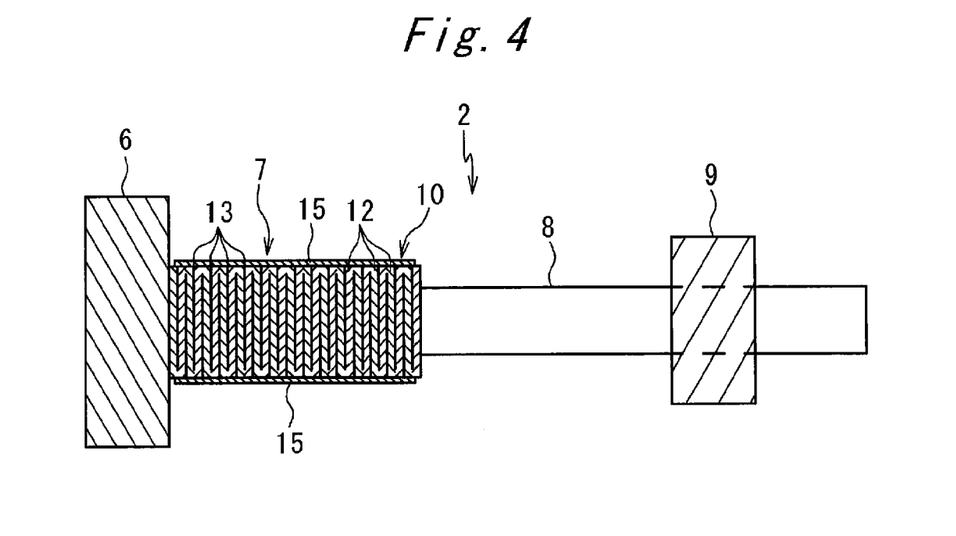
FIG. 4 is a sectional view at B-B in FIG. 2.

FIGS. 2 to 4 show details of the actuator 2. The actuator 2 comprises a weight 6, a piezoelectric element (electromechanical transducer) 7 of which on end is fixed to the weight 6, a shaft-like driving member 8 of which one end is fixed to the other end of the piezoelectric element 7, a movable member 9 engaging in a slidingly displaceable manner on the driving member 8. The piezoelectric element 7 has a pair of elongatable portions 10, 11 which can elongate and contract in an axial direction of the driving member 8 respectively and which are provided in parallel with each other.

As shown in FIGS. 3, 4, the piezoelectric element 7 is made by stacking up sheet formed piezoelectric layers 11 on which individually two print electrodes 13, 14 are printed, and forming external electrodes 15, 16 to connect every other print electrodes 13, 14. In the piezoelectric element 7, by applying a voltage between the both external electrode 15, the elongatable portion 10, that is a portion with interposition of the print electrodes 11, elongates and contracts according to the applied voltage, and by applying a voltage between the both external electrode 16, the elongatable portion 11 with the print electrode 14 interposed elongates and contracts according to the applied voltage. This means that elongatable portion 10 and elongatable portion 11 are provided in parallel with each other in a manner that enables elongatable portions 10, 11 to elongate and contract in an axial direction of the driving member 8 respectively.

With referring FIG. 1 again, the driving circuit 3 applying a voltage to the piezoelectric element 7 will be explained. The driving circuit 3 has two bridge circuits 18, 19 which can connect respectively the both electrodes 15 or 16 of the elongatable portions 10 or 11 of the piezoelectric element 7 to a direct current source 17 or the ground under a control of the controller 5. The bridge circuits 18, 19 have FETs 20, 21, 22, 23 or FETs 24, 25, 26, 27 switchingly operated by a control signal of the controller 5.

When the bridge circuits 18 and 19 output even voltage so as to apply coordinate phase voltages to the external electrodes 15 and 16 depending on the control signal of the controller 5, the elongation and the contraction portions 10 and 11 elongate and contract in same direction so as to displace driving member 8 in the axial direction. By rapidly contracting the elongatable portions 10, 11 after slowly elongating, the movable member 9 can be slidingly displaced on the driving member 8 so as to move the movable member 9 away from the piezoelectric element 7. Therefore, for moving the movable member 9 away from the piezoelectric element 7, the driving circuit 3 applies frictional driving voltage in the same phase, for instance, of a periodical rectangular waveform with frequency of 350 kHz and duty ratio of 30%, to the external electrodes 15 and 16, and for moving the movable member 9 closer to the piezoelectric element 7, the driving circuit 3 applies frictional driving voltage in the same phase, for instance, of a periodical rectangular waveform with frequency of 350 kHz and duty ratio of 70%, to the external electrodes 15 and 16.

Figure 5:
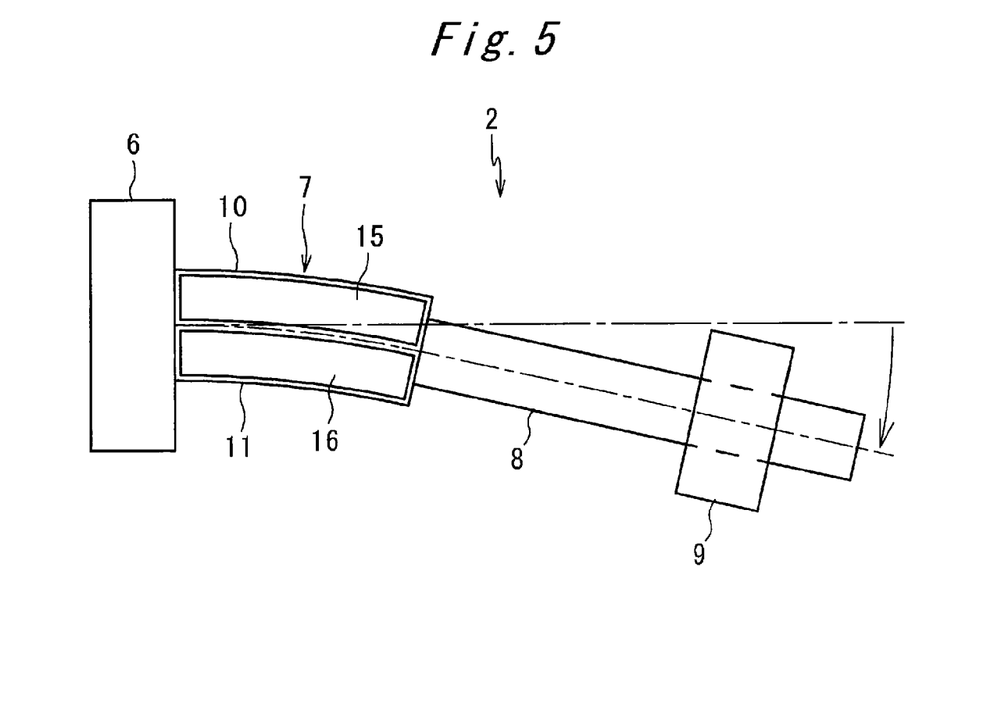
FIG. 5 is a view showing an inclining oscillation of the actuator in FIG. 2.

Further, the driving circuit 3 applies inclination driving voltages having a duty ratio of 50% in a phase opposite each other to the elongatable portion 10 and the elongatable portion 11, to oscillate inclinatory the driving member 8, depending on the control signal of the controller 5. When the opposite phase voltages are applied to the elongatable portion 10 and the elongatable portion 11, as shown in FIG. 5, a difference in length is caused between the elongatable portion 10 and the elongatable portion 11, hence the piezoelectric element 7 curves so as to incline the driving member 8 held on the end of the piezoelectric element 7.

The phase difference detection circuit 4 has a comparator 29 which outputs a difference of electrical potential between both ends of a shunt resistance 28 provided on the electrical path between the bridge circuit 19 and the piezoelectric element 7, a shaping operator 30 which amplifies the output of the comparator 29 with substantially big gain and digitalizes it, XOR operator 31 which outputs an exclusive or (XOR) of the output signal of the shaping operator 30 and the control signal driving the FET 24, a rectifier (a smoothing circuit or a low pass filter) 32 which outputs an average voltage of the output of the XOR operator 31, and a AD convertor 33 which converts the output voltage of the rectifier 32 to digital and input it into the controller 5.

In the case where the current flows through the shunt resistance 28 from the side of the piezoelectric element 7 to the side of the driving circuit 3, the electrical potential at the piezoelectric element 7 side of the shunt resistance 28 is higher than the other side. Therefore, the comparator 29 outputs a positive voltage and the shaping operator 30 outputs a voltage equal to a control power source voltage (for instance, 5V). In contrast, in the case where the current flows through the shunt resistance 28 from the side of the driving circuit 3 to the side of the piezoelectric element 7, the electrical potential at the piezoelectric element 7 side of the shunt resistance 28 is lower than the other side. However, the comparator 29 can not output any negative value. Therefore, the comparator 29 outputs 0V and so the shaping operator 30 also outputs 0V.

That means the output of the shaping operator 30 gets into a ON state when the current flowing through the piezoelectric element 7 is in a positive phase in which the current flows out from the piezoelectric element 7 via the shunt resistance, and gets into a OFF state when the current flowing through the piezoelectric element 7 is zero or in a negative phase in which the current flows into the piezoelectric element 7 from the shunt resistance.

At the resonance frequency of the inclining oscillation, the phase of the current flowing through the piezoelectric element 7 is coordinated with the phase of the voltage. Specifically, in a low frequency range, the piezoelectric element 7 can be assumed as a capacitance which advances in phase and so shows a capacitive characteristic. However, at a high frequency, since a reaction to the bending of the piezoelectric element 7 by the inertia force of the piezoelectric element 7 and the driving member 8 acts as a resistance to the current through the piezoelectric element 7, the piezoelectric element 7 presents a function to delay the phase of the current as a inductance. Since the resonance point maximizing the gain of the driving member 8 is a point where the capacitance and the inductance cancel each other, the piezoelectric element 7 has 100% of the power factor at the resonance frequency and the current is coordinated in phase with the voltage. If the frequency comes to higher than the resonance point, the function as an inductance gets stronger, and therefore inductive characteristic in which the current delays with reference to the voltage is presented.

Figure 6:
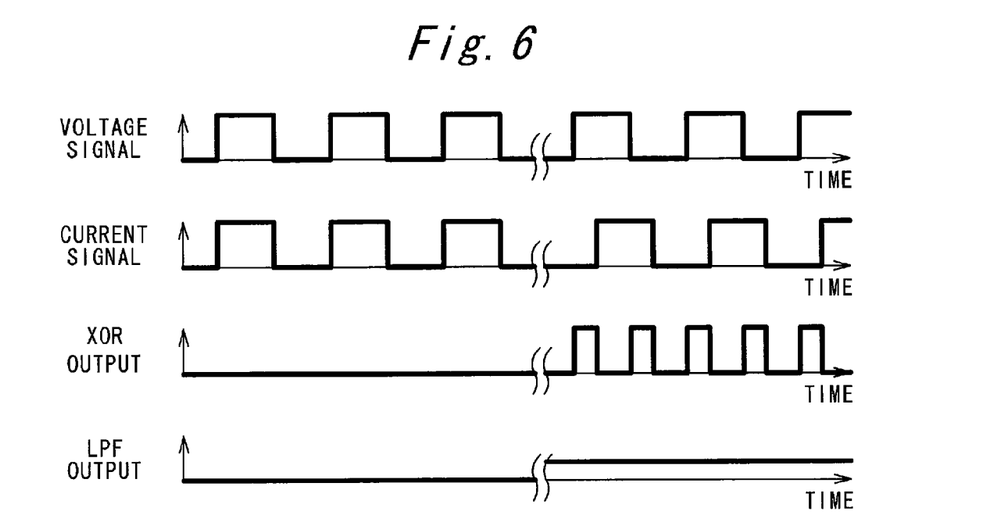
FIG. 6 is a chart showing relationship between detection signals in the vibratory driving device in FIG. 1.

FIG. 6 shows control signals for the TFT 24 which is driven in same phase with the inclination driving voltage, an output of the shaping operator 30 representing phase of a current of the piezoelectric element 7, an output of the XOR operator 31 and an output of the rectifier 32, when the inclination voltage having duty ratio of 50% is applied. In the figure, these in the case where the power factor of the piezoelectric element 7 is 100% are presented on left side, and these in the case where the current flowing through the piezoelectric element 7 is delayed with respect to the driving voltage is presented on right side.

The output of the XOR operator 31 is turned ON, only in the case where the phase of the driving voltage is different from the phase of the current of the piezoelectric element 7. That means the XOR operator 31 outputs a rectangular wave having a duty ratio proportional to the difference in phase between the current of the piezoelectric element 7 and the driving voltage (PWM signal), wherein the output wave get a duty ratio of 100% with a phase deference of ±180°. Notably, as described above, the phase difference that can be assumed a result of function as a capacitance and an inductance varies only in the range of ±90°, hence the maximum value of the duty ratio of the output of the XOR operator 31 is 50%.

Figure 7:
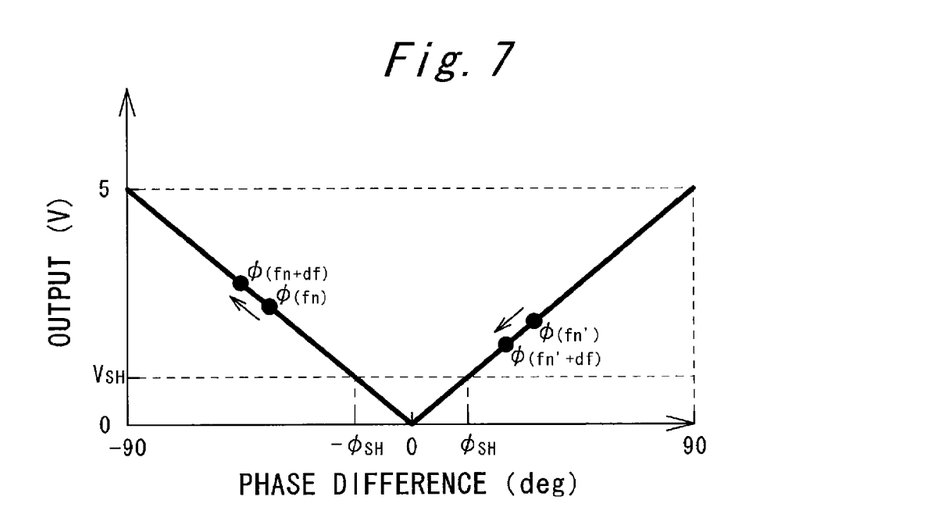
FIG. 7 is a chart showing a decision criterion in the vibratory driving device in FIG. 1.

The rectifier 32 averages the output voltage of the XOR operator 31 to output a direct current voltage as an analogue voltage signal proportional to the duty ratio of the XOR output. FIG. 7 shows an output voltage of the rectifier 32 according to the phase difference between the driving voltage and the current of the piezoelectric element 7. Since the rectifier 32 averages the output of the XOR operator 31, as shown in the figure, the rectifier 32 outputs the absolute value of that, hence the information whether the phase on the current is advanced or delayed with respect to the driving voltage. Into the controller 5, a signal which is a transformed voltage signal of the rectifier 32 in digital by the AD convertor 33 is input.

Figure 8:
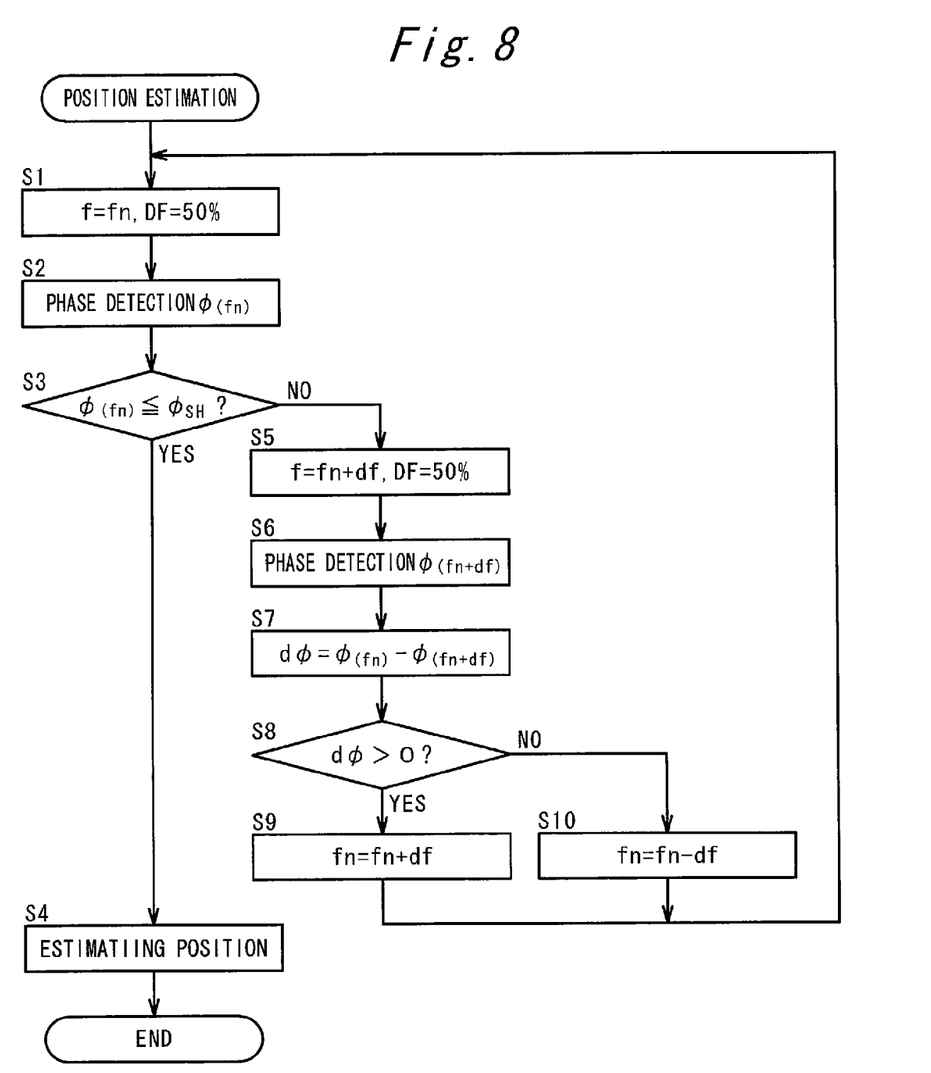
FIG. 8 is a flow chart of frequency measurement in the vibratory driving device in FIG. 1.

FIG. 8 shows a procedure for measuring the resonance frequency. In this measurement, at first, the driving circuit outputs an inclination driving voltage having a rectangular waveform, a detecting frequency fn, and a duty ratio of 50% in the step 1. The initial value of the detecting frequency fn is preset at the designed resonance frequency of the piezoelectric element 7 (for instance, 7 kHz) when the movable member 9 engages at the center of the driving member 8. Then, the output of the XOR operator 31 is checked while applying the inclination driving voltage with a frequency f=fn in the step S2, to detect a phase difference ø(fn) of the current of the piezoelectric element 7 with respect to the inclination driving voltage. For this detection, the required inclination driving voltage is about 100 pulses.

In the step S3, if the output voltage of the XOR operator 31 is less than or equal to a predetermined voltage $V_{SH}$, for instance 0.05V, that means if the absolute value of the phase difference ø(fn) of the current of the piezoelectric element 7 with respect to the driving voltage is less than of equal to an predetermined value $ø_{SH}$ (for instance 0.9°), it is assumed that the piezoelectric element 7 is in a resonance condition (resonance frequency meter). In this case, the detecting frequency fn of the inclination driving voltage is same as the resonance frequency of the inclining oscillation of the driving member 8 together with the movable member 9.

Therefore, if the phase difference ø(fn) of the current of the piezoelectric element 7 is less than or equal to the predetermined value $ø_{SH}$ (for instance 0.9°) in the step S3, the position of the movable member 9 is back calculated based on the detecting frequency fn. Practically, the position of the movable member 9 may be estimated by looking up the detecting frequency fn in the table which is stored in the controller 5 and which presents relation between the resonance frequency and the position of the movable member 9 and preliminary memorized (position estimator).

If the phase difference ø(fn) is large in the step S3 and so the detecting frequency is not considered as the resonant frequency of the piezoelectric element 7, the driving circuit 3 outputs an inclination driving voltage having a frequency f=(fn+df) which is increased in an minute frequency df from the detecting frequency fn and a duty ratio of 50%, after moving to the step S5. Then the phase difference ø(fn+df) of the current of the piezoelectric element 7 with respect to the driving voltage is detected in the step S6. The minute frequency df is for instance about 50 Hz.

Further, in the step S7, phase difference variance dø which is a difference between the phase difference ø(fn) and the phase difference ø(fn+df) is calculated. As shown in FIG. 7, since the output of the XOR operator 31 is an absolute value, when the current of the piezoelectric element 7 is in the delaying area, the phase difference increases with increasing of the frequency so that the phase difference variance dø shows a negative value. However, when the current of the piezoelectric element 7 is in the advancing area, since the phase difference decreases with increasing of the frequency, the phase difference variance dø shows a positive value.

Therefore, in the step S8, it is checked whether the phase difference variance dø is greater than zero or not. If the phase difference variance dø is greater than zero, present detecting frequency fn is lower than the resonance frequency of the piezoelectric element 7. In this case, hence the detecting frequency fn is increased by the minute frequency df after moving to the step S9.

On the other hand, when the phase difference variance dø is smaller than zero in the step S8, present detecting frequency fn is higher than the resonance frequency of the piezoelectric element 7, and therefore the detecting frequency fn is decreased by the minute frequency df in the step S10. After revising the detecting frequency fn in the step S9 or S10, with getting back again to the step S1, the detection of the phase difference by the inclination driving voltage is repeated. It is noted that the increasing amount in the step S9 and the decreasing amount in the step S10 of the detecting frequency is not always necessary to be same with the minute frequency df in the step S5.

As described above, the resonance frequency can be measured by checking the resonance condition of the inclining oscillation of the driving member with adjusting the detecting frequency fn, then the position of the movable member 9 can be estimated based on the resonance frequency. In this embodiment, it is determined whether to increase or to decrease the detecting frequency fn, by increasing the detecting frequency fn by the minute frequency df and checking whether the resonance condition is enhanced or not. Alternatively, with presetting the initial value of the detecting frequency as a frequency lower than the range of the possible resonance frequency, the detecting frequency fn may be only increased by the minute frequency df repeatedly, until the phase difference ø(fn) comes to lower than the predetermined value $ø_{SH}$.

Figure 9:
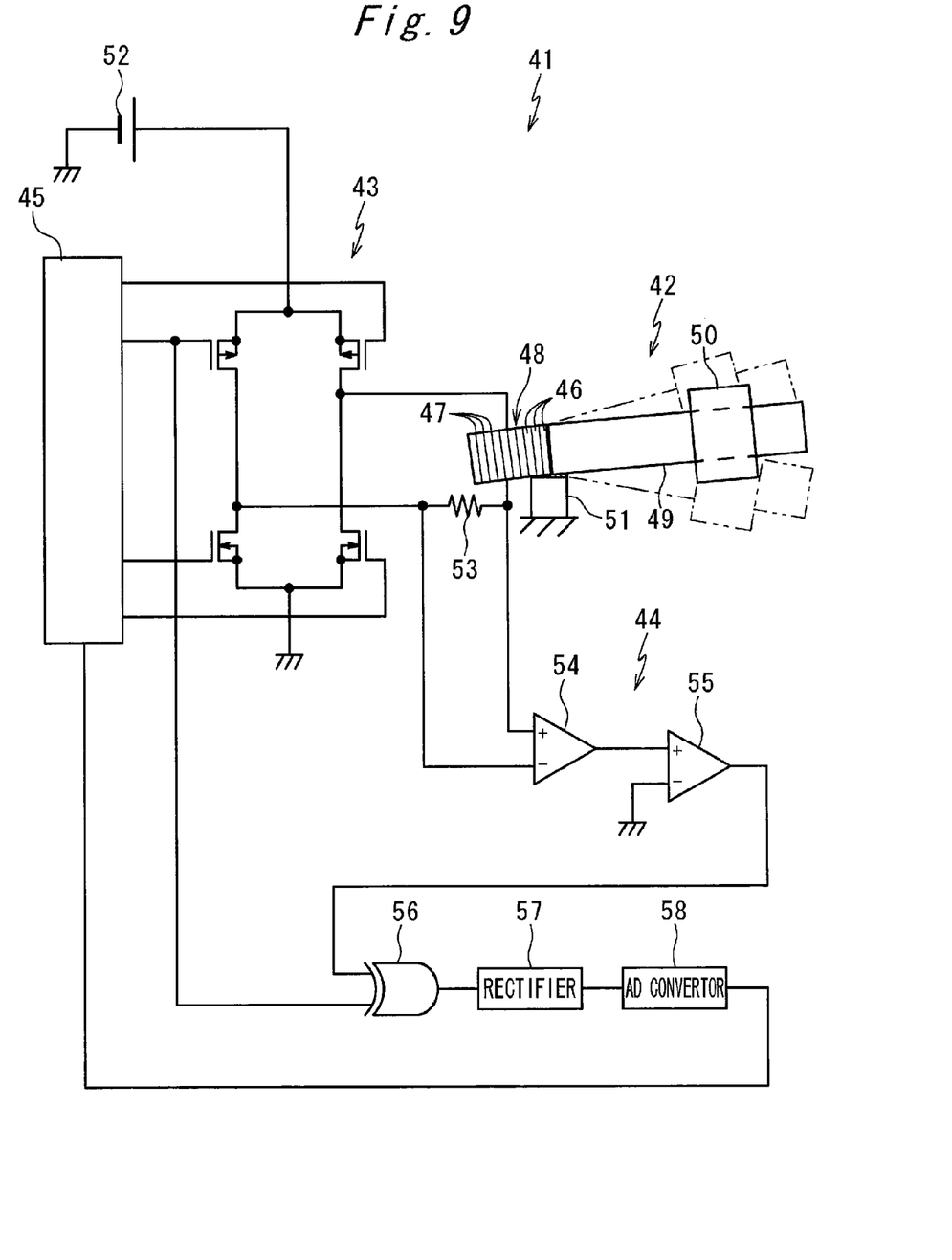
FIG. 9 is a circuit diagram of a vibratory driving device as second embodiment according to the present invention.

Next FIG. 9 shows a vibratory driving device 41 as second embodiment according to the present invention. The vibratory driving device 41 comprises an actuator 42, a driving circuit 43, a phase difference detection circuit 44 and a controller 55.

The actuator 42 has a piezoelectric element (electromechanical transducer) 48 which is made by stacking up alternately piezoelectric layers 46 and electrode layers 47 and which elongates and contracts according to an applied voltage in the stacking up direction, a shaft-like driving member 49 of which one end is fixed to the other end of the piezoelectric element 48 and which extends in the stacking up direction of the piezoelectric element 47, a movable member 50 which frictionally engages on the driving member 49 and a restraining member 51 which is bonded on the lower side of the circumference of the connected portion of the piezoelectric element 48 and the driving member 49 to support the piezoelectric element 48 and the driving member 49 and to restrain the bonded lower portion of the piezoelectric element 48 so as to restrict the dimensional displacement of the piezoelectric element 48.

In the actuator 42, the piezoelectric element 48 is restrained by the restraining member 51 in an imbalanced manner. As shown in the figure, in the case where the lower face of the circumference in the vicinity of the connected surfaces of the piezoelectric element 48 and the driving member 49 is fixed by bonding to the restraining member 51, with a voltage elongating the piezoelectric element 48 applied, the side of the connected surfaces of the piezoelectric element 48 and the driving member 49 where is not held by the restraining member 51 (upper side) moves to the side of the piezoelectric element 48, so as to incline the other end of the driving member 48 to the side opposite to the restraining member 51.

The driving circuit 43 is as a bridge circuit comprising four switching element which switches the power source voltage of the direct current source 52. The driving circuit 43 outputs a frictional driving voltage for instance of as a rectangular wave having a frequency of 350 kHz and a duty ratio of 30% or 70% for slidingly displacing the movable member 50 with respect to the driving member 49, and outputs a inclination driving voltage for instance of as a rectangular wave at the detecting frequency fn and 50% of duty ratio similar to the first embodiment for inclinatory oscillating the driving member 49.

The phase difference detection circuit 44 is configured similarly to the first embodiment, and so has a comparator 54 which outputs a difference of electrical potential between both ends of a shunt resistance 53 provided on the electrical path between the driving circuit 43 and the piezoelectric element 48, a shaping operator 55 which amplifies the output of the comparator 54 with substantially big gain and digitalizes it, XOR operator 56 which outputs an exclusive or (XOR) of the output signal of the shaping operator 55 and the control signal which has a coordinated phase with the voltage applied to the piezoelectric element 48, a rectifier 57 which outputs an average voltage of the output of the XOR operator 56, and a AD convertor 58 which converts the output voltage of the rectifier 57 to digital and input it into the controller 55.

Also in this embodiment, by changing the detecting frequency fn, with detecting the phase difference between the voltage and the current in the piezoelectric element 48 under the inclination driving voltage applied, until the detected phase difference comes to lower than a predetermined value, the resonance frequency of the inclinatory oscillation of the driving member 49 can be measured, and then the position of the movable member 50 can be estimated based on the measured resonance frequency.

Figure 10:
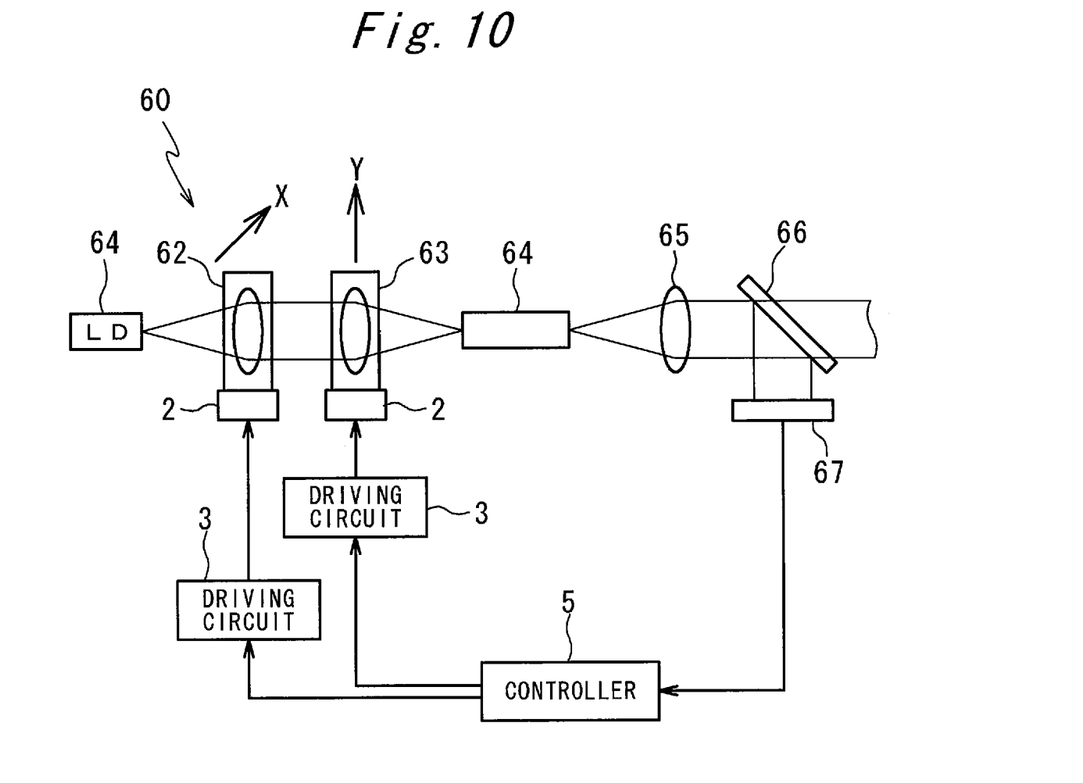
FIG. 10 is a schematic diagram of an optical apparatus using a vibratory driving device according to the present invention.

In addition, FIG. 10 shows a configuration of a laser module 60 as an optical device using vibratory driving devices 1 according to the present invention. The laser module 60 has a laser diode 61 for generating an infrared laser beam, a X-axis movable alignment lens 62 and a Y-axis movable alignment lens 63 for guiding the laser beam, a second harmonic generator 64 for receiving the laser beam and producing a green laser beam with half-wave length of the infrared laser beam, and an emission lens 65 for emitting output beam of the second harmonic generator 64.

The X-axis movable alignment lens 62 is held by the movable member 9 of the actuator 2 of above described vibratory driving device 1 and positioned by the actuator 2 in X direction orthogonal to an optical axis of the laser beam. The Y-axis movable alignment lens 63 is held by the movable member 9 of another actuator 2 and positioned by the associated actuator 2 in Y direction orthogonal to an optical axis of the laser beam and the X direction. Two driving circuits 3 driving the respective vibratory driving devices 1 are controlled by one controller 5.

The laser module 60 further has a beam splitter 66 for splitting the output beam from the second harmonic generator 64, a power monitor 67 composed of a sensor such as photodiode for converting an output level of the split output beam from the second harmonic generator 64 into a voltage signal. The controller 5 controls the operations of the driving circuits 3 in response to output of the power monitor 67.

A light receiving part of the second harmonic generator 64 has an aperture on the order of 1 to 3 μm. The alignment lenses 62, 63 cooperatively focus the laser beam so that the laser beam has a diameter on the same order as the aperture of the light receiving part of the second harmonic generator 64 and aligns an optical axis of the laser beam with a center of the light receiving part of the second harmonic generator 64. When the optical axis of the laser beam is aligned with the center of the second harmonic generator 64, all energy of the laser beam is inputted into the second harmonic generator 64, so that the output of the second harmonic generator 64 and the output of the power monitor 67 are maximized.

At the time of start-up, the laser module 60 estimates positions of the movable members 9 respectively by applying the inclination driving voltages to the vibratory driving devices 1. For this purpose, the controller 5 stores relation between the resonance frequency and the position of the movable member 9 with taking into account inertias of the movable members involving alignment lenses 62, 63. Then the controller 5 calculates distances between the estimated positions of the movable members 9 and respective designed center positions of the movable members 9, and causes the driving circuit 3 to output the frictional driving voltages with a duty ratio and a number of pulses which move the movable member 9 to the respective center position.

Then, the laser module 60 starts to align the laser beam with a wobbling operation in which the movable member 9 is displaced back and forth by a minute amount. In the wobbling operation, the driving circuit 3 applies to the actuator 2, at first, two pulses of the frictional driving voltage for advancing the movable member 9, 5 msec later, four pulses of the frictional driving voltage for retreating the movable member 9, and further 5 msec later, two pulses of the frictional driving voltage for advancing the movable member 9. Thereby, the movable member 9 is moved back and forth.

The controller 5 monitors the output of the power monitor 67 during the wobbling operation, calculates a difference between the output when the movable member 9 is advanced and the output when the movable member 9 is retreated, and causes the driving circuit 3 to output the frictional driving voltage with a duty ratio and a number of pulses which cause movement of the movable member 9 by a quantity proportional to the difference between the outputs. In the laser module 60, the optical axis of the laser beam focused by the alignment lenses 62, 63 can be thereby aligned with the center of the second harmonic generator 64, so that the output of the power monitor 67 is maximized.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A vibratory driving device comprising:
   a shaft-like driving member,
   a electromechanical transducer which can incline the driving member and which also can displace the driving member in the axial direction of the driving member,
   a movable member which slidably engages on the driving member,
   a driving circuit which can apply to the electromechanical transducer a periodic frictional driving voltage displacing the driving member back and forth with a speed varying asymmetrically in the axial direction to slidingly displace the movable member with respect to the driving member and a periodic inclination driving voltage inclinatory oscillating the driving member,
   a resonance frequency meter which measures a resonance frequency of the inclining oscillation of the driving member, and
   a position estimator which estimates a position of the movable member based on the resonance frequency.

2. The vibratory driving device according to claim 1, wherein the resonance frequency meter detects an electrical resonance of the electromechanical transducer.

3. The vibratory driving device according to claim 2, wherein the resonance frequency meter determines a frequency where a phase difference between a voltage and a current of the electromechanical transducer is eliminated, as the resonance frequency.

4. The vibratory driving device according to claim 1, wherein
   the electromechanical transducer has a plurality of elongatable portions which can elongate and contract in the axial direction of the driving member respectively, and which are provided in parallel with each other, and
   a first periodic voltage is applied to a first elongatable portion, and a second periodic voltage having a phase opposite to the first periodic voltage, is applied to a second elongatable portion, wherein that first and second elongatable portions are located in a symmetrical position.

5. The vibratory driving device according to claim 4, wherein number of the elongatable portions of the electromechanical transducer is two.

6. The vibratory driving device according to claim 1, wherein the electromechanical transducer elongates and contracts in the axial direction of the driving member and is partially restrained so as to restrict the elongation and contraction of the electromechanical transducer in an imbalanced manner.

7. An optical apparatus comprising the vibratory driving device according to claim 1 and an optical member held by the movable member of the vibratory driving device, wherein the optical member is positioned based on a position of the movable member estimated by the position estimator.

* * * * *